Patented Oct. 17, 1922.

1,431,962

UNITED STATES PATENT OFFICE.

WILLARD H. KEMPTON, OF WILKINSBURG, PENNSYLVANIA, ASSIGNOR TO WESTINGHOUSE ELECTRIC & MANUFACTURING COMPANY, A CORPORATION OF PENNSYLVANIA.

MOLDED INSULATION AND METHOD OF MAKING SAME.

No Drawing.  Application filed January 8, 1919. Serial No. 270,140.

*To all whom it may concern:*

Be it known that I, WILLARD H. KEMPTON, a citizen of the United States, and a resident of Wilkinsburg, in the county of Allegheny and State of Pennsylvania, have invented a new and useful Improvement in Molded Insulation and Method of Making Same, of which the following is a specification.

My invention relates to the manufacture of articles of insulating material and more particularly articles formed of so-called asbestos lumber which comprises, as its essential ingredients, asbestos and Portland cement, and it has, for its primary object, the provision of a method by which it is possible to water-proof insulating material of this character or articles made of such material.

Heretofore, various methods of water-proofing asbestos lumber or articles molded therefrom have been practiced but, for one reason or another, none of them have been satisfactory. For example, one method employed has consisted in treating the lumber, or article formed thereof, with a readily polymerizable or oxidizable oil, such as China wood oil, and baking it to cause polymerization of the oil. It has, however, been practically impossible to cause an oil of this character, capable of polymerizing throughout its entire extent, to penetrate articles of a moldable composition, such as asbestos lumber, and, for this reason, the water-proofing has been only superficial when done by this method.

It has also been found that certain other oxidizable oils, particularly linseed oil, will more thoroughly penetrate the entire body of asbestos lumber but, heretofore, it has been impossible to employ such oils because of the fact that they oxidize or polymerize only at their surface and that, as a result, it is practically impossible to harden that portion of the oil contained within the treated material.

My present invention provides a method by which cold-molded insulation, such as asbestos lumber or articles formed thereof, may be water-proofed throughout their entire extent by impregnating them with linseed oil, and in which the entire amount of linseed oil, with which they are impregnated, may be effectively and surely hardened.

Broadly, my invention comprises the addition of an agent capable of oxidizing the oil, to be employed as the water-proofing agent, to the molding composition so that, when the article formed thereof has been impregnated with the oil, the latter may be completely oxidized or polymerized by suitable treatment, on account of the presence of the oxidizing agent.

While various moldable compositions of insulating material and articles formed thereof may be treated by my method, and, while different water-proofing oils may be provided, my invention primarily relates to the water-proofing of asbestos lumber and articles formed thereof by the employment of linseed oil.

In practising my invention, I may add a suitable amount of any drier or oxidizing agent suitable for the purpose, that is, one that is not affected by the conditions incident to the curing of the moldable material and which is capable of assisting in the oxidization or polymerization of the oil employed as the water-proofing agent, to the ingredients constituting the molding composition. Since asbestos lumber is the composition to be treated, the oxidizing agent employed should be one that is insoluble in water or steam, as the articles formed of this material must be cured in water or steam. Furthermore, as articles formed of such material are usually employed for insulating purposes, the oxidizing agent employed should have insulating properties. Numerous driers may be employed and will suggest themselves to those skilled in the art. I have found, however, that certain powdered driers or oxidizers, such as manganese resinate or the commercially named "tox tungate solid" are very satisfactory.

The amount of the drier employed should, of course, be proportionate to the quantity of the oil which will be absorbed by the molded article formed from the composition and will also vary with the different driers used. When manganese resinate is employed, I prefer to use approximately 2% of the manganese resinate, as compared with the calculated amount of linseed oil which will be absorbed. When tox tungate solid, which is a resinate-tungate of lead and manganese, is employed, approximately 10%, as compared with the calculated quantity of absorbed oil, should be used.

Articles may be molded from the moldable composition to which the oxidizer has been added and be cured in the usual manner, and these articles of asbestos lumber may then be water-proofed, according to my invention, by immersing them in heated linseed oil, or otherwise treating them to insure a thorough penetration of the oil to all parts of the articles, and by then subjecting the articles to heat in any suitable manner, as by the employment of an oven, to cause oxidization or polymerization of the linseed oil absorbed by them.

By treating the articles in the heated oil, a complete penetration of the oil to all parts of the articles is insured and, in view of the presence of the drier or oxidizing agent in the articles and, therefore, in direct contact with the oil, a complete polymerization of all of the oil is insured.

As various modifications of this method are possible, and numerous driers and oils may be employed for the water-proofing of articles of various moldable compositions, my invention is to be in no way limited except as indicated in the appended claims.

I claim as my invention:

1. The method of forming a waterproof insulation which comprises adding an oxidizing agent to a moldable composition, molding and curing bodies therefrom, impregnating the bodies thus formed with a water-proofing oil adapted to be oxidized by the oxidizing agent present in them and causing such oxidization.

2. The method of forming bodies of insulating material which comprises adding an oxidizing agent to a moldable composition, forming bodies from such composition and curing them, impregnating them with linseed oil and causing oxidization of the linseed oil by the oxidizing agent.

3. The method of forming waterproof bodies which comprises adding an oxidizing agent to a moldable composition comprising mainly asbestos and Portland cement, molding bodies therefrom and curing them, immersing the bodies so formed in boiling linseed oil to impregnate them therewith and subjecting the impregnated bodies to heat to cause the oil and oxidizing agent to react.

4. The method of forming waterproof bodies which comprises adding a drier to a moldable composition comprising mainly asbestos and Portland cement, forming and curing bodies of the composition, impregnating them with an oil adapted to be oxidized by the agent contained in them and heating them to cause such oxidization.

5. The method of forming waterproof bodies which comprises adding manganese resinate to a composition comprising mainly asbestos and Portland cement, forming bodies of the resultant mixture, treating the bodies to set the cement, treating the bodies in hot linseed oil, and heating the bodies to cause complete oxidization of the linseed oil because of the presence of the oxidizing agent.

6. A waterproof body comprising asbestos, Portland cement and the reaction products of an oxidizing agent and an oil distributed throughout the body.

7. A waterproof body comprising throughout its entire structure asbestos, Portland cement and oxidized linseed oil.

8. A waterproof body comprising asbestos, Portland cement and the reaction products of linseed oil and a drier.

9. A waterproof body comprising asbestos, Portland cement and the reaction products of linseed oil and manganese resinate.

10. A waterproof body comprising a filler, a binder, an oxidizing agent and an oxidizable oil.

11. A waterproof body comprising a filler, a binder and the reaction products of an oxidizing agent and an oxidizable oil distributed throughout the body.

In testimony whereof, I have hereunto subscribed my name this 24th day of Dec. 1918

WILLARD H. KEMPTON.